M. MERK.
Side-Hill Plow.
No. 20,812.  Patented July 6, 1858.
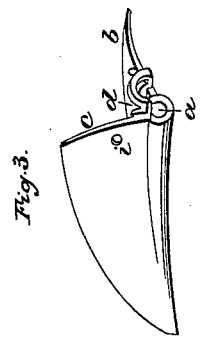
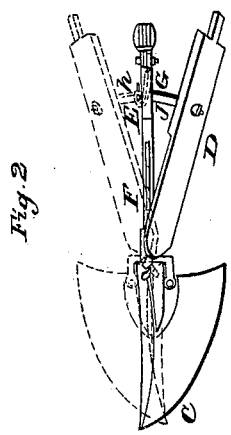
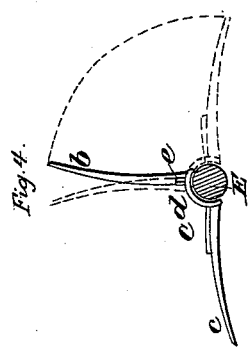
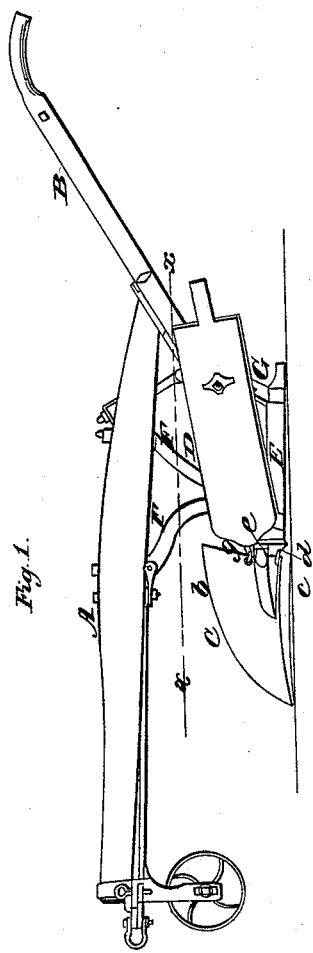

UNITED STATES PATENT OFFICE.

M. MERK, OF ROCHESTER, NEW YORK.

IMPROVEMENT IN HILLSIDE-PLOWS.

Specification forming part of Letters Patent No. 20,812, dated July 6, 1858.

*To all whom it may concern:*

Be it known that I, MODEST MERK, of Rochester, in the county of Monroe and State of New York, have invented a new and useful Improvement in Hillside-Plows; and I do hereby declare that the following is a full, clear, and exact description of the construction and operation of the same, reference being had to the accompanying drawings, making part of this specification, and to the letters of reference marked thereon.

The same letters refer to corresponding parts in all of the figures.

My improvement consists in the peculiar manner of constructing and arranging the share and mold-boards.

Figure 1 represents a side elevation of my plow. Fig. 2 is a horizontal section on the line $x$ $x$ of Fig. 1.

A is the draft-beam; B, the handles; C, the colter-share and mold-board, and D the subsidiary mold-board. E is a furrow-bar occupying the position of the ordinary landside, and F F the frame, constructed of iron and securely bolted to the bar E and connecting it with the wood-work. The front end of the furrow-bar is inserted in a round socket in the share C. (Shown at $a$, Fig. 3, which is a perspective view of the share detached.) From the two wings $b$ $c$ a bar wrought to the proper shape forms a segmental slot, $d$. A pin, $e$, through this slot is inserted in the furrow-bar, and allows the share to rotate a quarter of a circle, as indicated in the transverse section, Fig. 4.

The share is constructed to answer the triple purpose of colter, point, and mold-board. It consists of two wings starting at right angles from one center and diminishing with a rapid curve from the head to the point. The distance from their center to the greatest point of projection is equal to the width of furrow to be cut, and also equal to if not greater than its depth. Therefore, the edges being sharp, the vertical one serves as a colter by cutting the soil and turf gradually as it moves, while the horizontal one cleaves the earth at the bottom of the furrow and leaves it free to be turned over. The wings of the share are curved, to present each a convex side to the furrow and a concave one to the land and bed of the furrow, which gives the earth a considerable of the curve necessary to turn the furrow, after passing which the inclined plane or subsidiary mold-board D receives the raised earth, and by the oblique face which it presents completes the operation of turning the furrow. The share is constructed of wrought-iron with steel edges welded to the wings to insure sharpness and durability.

The subsidiary mold-board consists of a flat plate of metal having a hook, $g$, at one end, and an arm, J, attached by a screw-bolt near the other. This arm passes through a mortise in the rear portion of the frame G, where it is held by a pin, $h$. The hook is inserted in the hole $i$ in the upright wing of the share, and as the arm is fastened at G the back of the plate is pressed hard against the forward frame-piece, F, which serves as a fulcrum by which it holds the share C securely in its position.

To reverse the mold-board at the end of the furrow it is only necessary to take out the pin $h$, turn the share C, and reinsert the hook and arm on the other side of the furrow-bar, as indicated by dotted lines in Fig. 2. The concave sides presented by the share C render the draft easy by presenting constant contact with the bottom of the furrow and landside and enables it to pass stones more readily.

The construction is every way simple and strong and calculated to do efficient work with light draft.

What I claim as my improvement in hillside-plows, and desire to secure by Letters Patent, is—

The reversible convex-winged colter-share C, constructed as described, in combination with the plane subsidiary mold-board D, connecting-arm J, and furrow-bar E, arranged and operating substantially as and for the purpose set forth.

MODEST MERK.

Witnesses:
J. FRASER,
S. J. ALLIS.